(12) United States Patent
Jenne

(10) Patent No.: US 9,129,124 B2
(45) Date of Patent: Sep. 8, 2015

(54) DYNAMIC PROVISIONING OF VIRTUAL SYSTEMS

(75) Inventor: Nathan Jenne, Lincoln, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 163 days.

(21) Appl. No.: 13/445,374

(22) Filed: Apr. 12, 2012

(65) Prior Publication Data

US 2013/0275967 A1    Oct. 17, 2013

(51) Int. Cl.
*G06F 9/455* (2006.01)
*G06F 21/62* (2013.01)
*H04L 29/06* (2006.01)

(52) U.S. Cl.
CPC ............ *G06F 21/62* (2013.01); *G06F 9/45558* (2013.01); *H04L 63/08* (2013.01)

(58) Field of Classification Search
CPC ..... G06F 21/50; G06F 21/53; G06F 21/6218; G06F 9/45558; G06F 2009/45587; G06F 21/62; H04L 63/08; H04L 63/10; H04L 63/102; H04L 63/143; H04L 45/586; H04L 67/08; H04W 12/06
USPC ................... 709/224, 226, 229; 718/1; 726/4
See application file for complete search history.

(56) References Cited

U.S. PATENT DOCUMENTS

| | | | |
|---|---|---|---|
| 6,976,258 B1 | 12/2005 | Goyal et al. | |
| 6,985,937 B1 | 1/2006 | Keshav et al. | |
| 7,155,558 B1 * | 12/2006 | Vaghani et al. | 711/4 |
| 7,376,827 B1 * | 5/2008 | Jiao | 713/153 |
| 7,574,202 B1 * | 8/2009 | Tsao et al. | 455/411 |
| 7,774,498 B1 * | 8/2010 | Kraemer et al. | 709/240 |
| 7,783,822 B2 * | 8/2010 | Purcell et al. | 710/316 |
| 7,869,436 B1 * | 1/2011 | Adler et al. | 370/392 |
| 7,962,545 B2 * | 6/2011 | Knauerhase et al. | 709/203 |
| 7,970,914 B2 | 6/2011 | Bowen et al. | |
| 8,244,882 B2 * | 8/2012 | Davidson | 709/228 |
| 8,249,081 B2 * | 8/2012 | Chang et al. | 370/397 |
| 8,284,783 B1 * | 10/2012 | Maufer et al. | 370/395.54 |
| 8,341,270 B2 * | 12/2012 | Mazzaferri et al. | 709/227 |
| 8,601,544 B1 * | 12/2013 | Robinson et al. | 726/3 |
| 8,612,971 B1 * | 12/2013 | Fitzgerald et al. | 718/1 |
| 8,745,734 B1 * | 6/2014 | Brandwine et al. | 726/22 |
| 8,850,512 B2 * | 9/2014 | Price et al. | 726/1 |
| 2002/0029308 A1 * | 3/2002 | Babaian et al. | 710/240 |
| 2005/0021979 A1 * | 1/2005 | Wiedmann et al. | 713/182 |
| 2005/0055570 A1 * | 3/2005 | Kwan et al. | 713/201 |

(Continued)

FOREIGN PATENT DOCUMENTS

KR    1020070126912 A  *  8/2009   ............ G06Q 10/00

OTHER PUBLICATIONS

Constandache, "Secure Control of Portable Images in a Virtual Computing Utility", VMSEC'08, Oct. 31, 2008, 8 pages.*

(Continued)

*Primary Examiner* — Andrew Nalven
*Assistant Examiner* — Walter Malinowski
(74) *Attorney, Agent, or Firm* — Van Cott, Bagley, Cornwall & McCarthy

(57) ABSTRACT

A method for dynamic provisioning of virtual systems includes, with a server system that hosts virtual systems, detecting a new virtual system on the server system, and with the server system, using a physical address of the new virtual system to perform network authentication on behalf of the new virtual system.

20 Claims, 5 Drawing Sheets

(56) References Cited

U.S. PATENT DOCUMENTS

| | | | | |
|---|---|---|---|---|
| 2005/0114598 A1* | | 5/2005 | Hartung et al. | 711/114 |
| 2005/0120160 A1* | | 6/2005 | Plouffe et al. | 711/1 |
| 2005/0264527 A1* | | 12/2005 | Lin | 345/156 |
| 2006/0004944 A1* | | 1/2006 | Vij et al. | 711/6 |
| 2006/0083254 A1* | | 4/2006 | Ge et al. | 370/401 |
| 2006/0206687 A1* | | 9/2006 | Vega | 711/206 |
| 2006/0209836 A1* | | 9/2006 | Ke et al. | 370/392 |
| 2006/0259759 A1* | | 11/2006 | Maino et al. | 713/151 |
| 2007/0036178 A1* | | 2/2007 | Hares et al. | 370/490 |
| 2007/0088822 A1* | | 4/2007 | Coile et al. | 709/224 |
| 2007/0101012 A1* | | 5/2007 | Li et al. | 709/231 |
| 2007/0195613 A1* | | 8/2007 | Rajan et al. | 365/189.05 |
| 2007/0220170 A1* | | 9/2007 | Abjanic et al. | 709/246 |
| 2007/0271388 A1* | | 11/2007 | Bowra et al. | 709/231 |
| 2007/0274259 A1* | | 11/2007 | Sayegh et al. | 370/331 |
| 2008/0005798 A1* | | 1/2008 | Ross | 726/26 |
| 2008/0016386 A1* | | 1/2008 | Dror et al. | 714/4 |
| 2008/0040491 A1* | | 2/2008 | Minodier et al. | 709/229 |
| 2008/0082640 A1* | | 4/2008 | Chang et al. | 709/220 |
| 2008/0098194 A1* | | 4/2008 | Hashimoto et al. | 711/173 |
| 2008/0123676 A1* | | 5/2008 | Cummings et al. | 370/419 |
| 2008/0127147 A1* | | 5/2008 | Bottomley et al. | 717/151 |
| 2008/0212598 A1* | | 9/2008 | Kolli et al. | 370/409 |
| 2008/0244103 A1* | | 10/2008 | Gale | 710/10 |
| 2008/0253380 A1* | | 10/2008 | Cazares et al. | 370/395.53 |
| 2009/0049546 A1* | | 2/2009 | Verma | 726/22 |
| 2009/0063849 A1* | | 3/2009 | Doyle et al. | 713/151 |
| 2009/0070760 A1* | | 3/2009 | Khatri et al. | 718/1 |
| 2009/0222517 A1* | | 9/2009 | Kalofonos et al. | 709/204 |
| 2009/0222542 A1* | | 9/2009 | Miyajima | 709/222 |
| 2009/0240874 A1* | | 9/2009 | Pong | 711/105 |
| 2009/0249472 A1* | | 10/2009 | Litvin et al. | 726/14 |
| 2009/0254642 A1* | | 10/2009 | Geist | 709/222 |
| 2009/0254990 A1* | | 10/2009 | McGee | 726/22 |
| 2009/0262741 A1* | | 10/2009 | Jungck et al. | 709/246 |
| 2010/0011431 A1* | | 1/2010 | Cynkin et al. | 726/9 |
| 2010/0027516 A1* | | 2/2010 | Nagarajan | 370/338 |
| 2010/0037296 A1* | | 2/2010 | Silverstone | 726/3 |
| 2010/0061391 A1* | | 3/2010 | Sindhu et al. | 370/412 |
| 2010/0100879 A1* | | 4/2010 | Katiyar | 718/1 |
| 2010/0125856 A1* | | 5/2010 | Dash et al. | 719/321 |
| 2010/0131731 A1* | | 5/2010 | Yamamoto et al. | 711/163 |
| 2010/0138534 A1* | | 6/2010 | Mutnuru et al. | 709/224 |
| 2010/0165876 A1* | | 7/2010 | Shukla et al. | 370/254 |
| 2010/0165877 A1* | | 7/2010 | Shukla et al. | 370/254 |
| 2010/0169558 A1* | | 7/2010 | Honda et al. | 711/103 |
| 2010/0175064 A1* | | 7/2010 | Brahmaroutu | 718/1 |
| 2010/0180272 A1* | | 7/2010 | Kettler et al. | 717/171 |
| 2010/0198972 A1 | | 8/2010 | Umbehocker | |
| 2010/0229224 A1* | | 9/2010 | Etchegoyen | 726/5 |
| 2010/0246443 A1* | | 9/2010 | Cohn et al. | 370/255 |
| 2010/0257602 A1* | | 10/2010 | Kettler et al. | 726/19 |
| 2010/0274984 A1* | | 10/2010 | Inomata et al. | 711/162 |
| 2010/0318997 A1* | | 12/2010 | Li et al. | 718/104 |
| 2011/0022711 A1* | | 1/2011 | Cohn | 709/225 |
| 2011/0029775 A1* | | 2/2011 | Sakai et al. | 713/171 |
| 2011/0055903 A1* | | 3/2011 | Leggette | 726/4 |
| 2011/0131423 A1* | | 6/2011 | Ponsini | 713/189 |
| 2011/0153697 A1* | | 6/2011 | Nickolov et al. | 707/827 |
| 2011/0154454 A1* | | 6/2011 | Frelechoux | 726/5 |
| 2011/0173611 A1* | | 7/2011 | Takebe et al. | 718/1 |
| 2011/0199928 A1* | | 8/2011 | Jiang et al. | 370/252 |
| 2011/0202920 A1* | | 8/2011 | Takase | 718/1 |
| 2011/0216656 A1* | | 9/2011 | Pratt et al. | 370/241 |
| 2011/0271277 A1* | | 11/2011 | Hussain et al. | 718/1 |
| 2011/0274110 A1* | | 11/2011 | Mmmadi et al. | 370/392 |
| 2011/0307888 A1* | | 12/2011 | Raj et al. | 718/1 |
| 2011/0314533 A1 | | 12/2011 | Austin et al. | |
| 2012/0054486 A1* | | 3/2012 | Lakkavalli et al. | 713/156 |
| 2012/0054843 A1* | | 3/2012 | Horman et al. | 726/7 |
| 2012/0089666 A1* | | 4/2012 | Goswami et al. | 709/203 |
| 2012/0089775 A1* | | 4/2012 | Ranade et al. | 711/113 |
| 2012/0117563 A1* | | 5/2012 | Chang et al. | 718/1 |
| 2012/0151358 A1* | | 6/2012 | Joanny et al. | 715/736 |
| 2012/0173757 A1* | | 7/2012 | Sanden | 709/238 |
| 2012/0254567 A1* | | 10/2012 | Umbehocker | 711/162 |
| 2012/0324442 A1* | | 12/2012 | Barde | 718/1 |
| 2012/0324536 A1* | | 12/2012 | McDysan | 726/3 |
| 2013/0031000 A1* | | 1/2013 | Morris | 705/44 |
| 2013/0085720 A1* | | 4/2013 | Xie et al. | 703/1 |
| 2013/0117806 A1* | | 5/2013 | Parthasarathy et al. | 726/1 |
| 2013/0132952 A1* | | 5/2013 | Shah | 718/1 |
| 2013/0159637 A1* | | 6/2013 | Forgette et al. | 711/154 |
| 2013/0159987 A1* | | 6/2013 | Shi et al. | 717/170 |
| 2013/0219505 A1* | | 8/2013 | Xue et al. | 726/26 |
| 2013/0290543 A1* | | 10/2013 | Lochhead et al. | 709/226 |
| 2014/0032795 A1* | | 1/2014 | Krause | 710/29 |

OTHER PUBLICATIONS

Upton, "Detection and Subversion of Virtual Machines", www.cs.virginia.edu, 2006, pp. 1-7.*

* cited by examiner

Dynamic Virtual System Provisioning (300)

Virtual Server System (302)

Virtual System 1 (304-1)

Virtual System 2 (304-2)

Virtual System 3 (304-3)

Neighbor Network Device (306)

Network (308)

Authentication Server (310)

DYNAMIC PROVISIONING OF VIRTUAL SYSTEMS

BACKGROUND

Many physical network servers are designed to act as virtual servers. A virtual server is one that hosts a number of virtual machines. A virtual machine is a separate isolated guest operating system installation that operates within the virtual server operating system. Virtualization of the guest operating system may be done through either hardware virtualization, software emulation, or sometimes a combination of both. Computing entities that interact with a virtual machine do so as if the virtual machine were a physical computing system.

There are many advantages to using virtual machines. Most notably, a server system can run multiple virtual systems, each operating within isolation of each other. The virtual server can also provide different instruction set architectures to different virtual machines. Additionally, a virtual system may be moved to different physical servers, thus allowing greater mobility of a system.

In many cases, an entity that controls a virtual server system may be different than the entity or entities that control the multiple virtual systems that run on the virtual server. For example, the owner of a virtual system may enter into a business arrangement that allows the virtual system to run on the virtual server. This can often result in forced sharing of sensitive information. Specifically, the owner of the virtual system has to have access to the virtual system in order to allow that virtual system to communicate over a network. Moreover, the administrative effort that is needed to configure the virtual systems for operation over the network may be relatively burdensome.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

Figure 1:
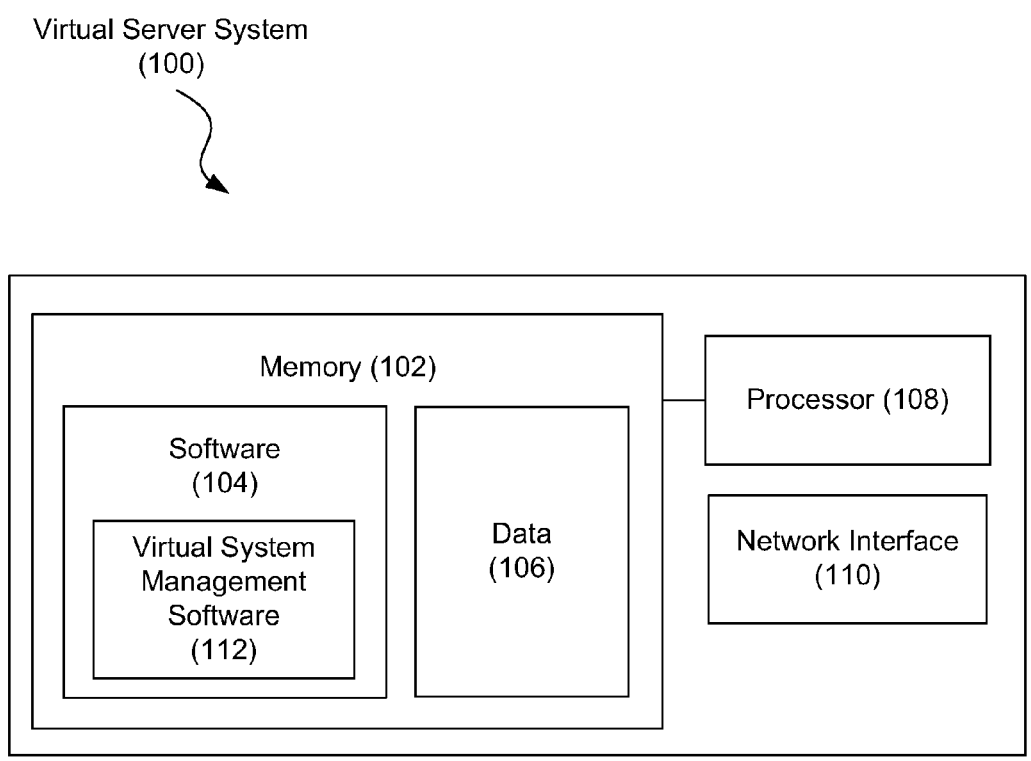
FIG. 1 is a diagram showing an illustrative virtual server system, according to one example of principles described herein.

As mentioned above, an entity that controls a virtual server system may be different than the entity or entities that control the multiple virtual systems that run on the virtual server. For example, the owner of a virtual system may enter into a business arrangement that allows the virtual system to run on the virtual server. This can often result in forced sharing of sensitive information. Specifically, the owner of the virtual system has to have access to the virtual system in order to allow that virtual system to communicate over a network. Moreover, the administrative effort that is needed to configure the virtual systems for operation over the network may be relatively burdensome.

Typically, when a new virtual system is first placed onto a virtual server, the virtual system has to be authenticated on the network in order to be able to send and receive data over the network. This authentication may be done through a Virtual Local Area Network (VLAN) identifier (VID) that is tagged onto packets transmitted from that virtual system. The VID identifies a specific VLAN on which the virtual system is authorized to operate. If the packet contains the appropriate VID, then the network device connected to the virtual server can forward the traffic accordingly. This, however, relies on a specific configuration of the network device to handle the VLAN to which the virtual system belongs.

In light of this and other issues, the present specification discloses methods and system for dynamic network provisioning that allows for more isolation between the operator of the virtual server and the operator of the virtual systems that run on that server. According to certain illustrative examples, the virtual server is designed to perform network authentication on behalf of the virtual systems that it is hosting.

Network authentication is performed through an authentication server such as a Remote Access Dial-in User Service (RADIUS) server. Using such authentication, a RADIUS networking protocol is used to send data from the virtual system to the RADIUS server. The RADIUS server is preconfigured to recognize the virtual system as being authorized to operate on the network. The RADIUS server then sends provisioning information back to the network device connected to the virtual system running the recently authenticated virtual machine. The provisioning information is used to configure the port on the network device that connects to the virtual server. With the port configured, the virtual machine can operate securely on the network according to the access granted by the provisioning information.

The RADIUS server is designed to recognize packets by the source address attached to the data packet containing the request for authorization. This address is a physical address such as a Media Access Control (MAC) address. As virtual machines are designed to present themselves as physical devices, data packets from a specific virtual machine are tagged with the MAC address of that virtual machine.

According to certain illustrative examples, the virtual server is designed to perform network authentication on behalf of a hosted virtual system by impersonating the physical address of that virtual system. Specifically, as the virtual system is aware of the physical address of its hosted virtual systems, it can use that physical address to send a request to the authentication server. This request will indicate as the physical address of the virtual system to be authenticated as the source. The authentication server will then send the provisioning information to the network device connected to the virtual system. With the port properly configured, the virtual system can send and receive data packets on behalf of the authenticated virtual machine by using the physical address of that virtual machine.

Through use of methods and systems embodying principles described herein, less administrative effort may be employed to set up virtual systems on new or different virtual servers. Virtual systems may be transferred between different virtual servers with less effort. Moreover, more isolation between the virtual systems and the virtual server may be achieved.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram showing an illustrative virtual server system (100) that can be used to host multiple virtual systems. As mentioned above, the virtual server system is a physical computing system. According to certain illustrative examples, the virtual server system (100) includes a memory (102) having software (104) and data (106) stored thereon. The virtual server system (100) also includes a processor (108) and a user interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106). Throughout this specification and the appended claims, the term software refers to any type of machine readable instructions.

The virtual server system (100) also includes a processor (108) for executing the software (104) and using or updating the data (106) stored in memory (102). The software (104) may include an operating system. An operating system allows other applications to interact properly with the hardware of the physical computing system. Such other applications may include virtual system management software (112). Virtual system management software is used to manage and run multiple virtual systems on the server system (100). Such virtual system management software is sometimes referred to as a hypervisor.

A network interface (110) is used to connect the virtual server system (100) to a network. This connection may be done through a physical connection such as an ethernet cable, coaxial cable, or fiber optic cable. Alternatively, the network interface (110) may communicate with the network wirelessly. The virtual system management software (112) allows each of the virtual systems running on the server system (100) to use the network interface (110) to access the network.

Figure 2:
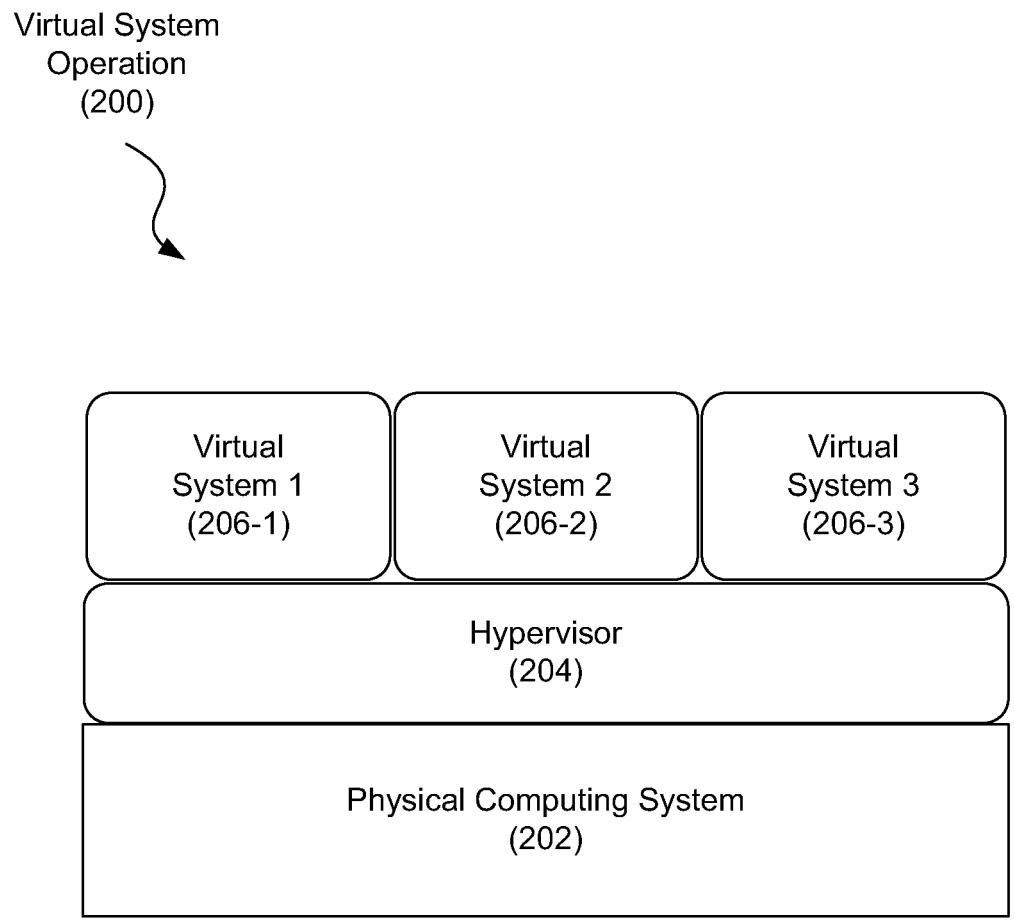
FIG. 2 is a diagram showing illustrative virtual system operation, according to one example of principles described herein.

FIG. 2 is a diagram showing illustrative virtual system operation. According to certain illustrative examples, a hypervisor (204) runs on a physical computing system (202) such as a virtual server system. The hypervisor manages a number of virtual systems (206).

As mentioned above, a hypervisor (204) is used to manage multiple virtual systems (206) running on the same physical computing system (202). The hypervisor (204) presents the virtual systems (206) with a virtual operating platform and manages execution of the virtual operating systems of the virtual systems (206) on the physical computing system (202).

The hypervisor (204) is designed to treat each of the different operating systems of the virtual systems separately. Thus, different virtual systems can run completely independent of the other virtual systems. This isolation is useful, especially in cases where the different virtual systems are operated by different entities. For example, it may be the case that virtual system 1 (206-1) and virtual system 2 (206-2) are operated by a first entity. Virtual system 3 (206-3) may be operated by a second entity. Those entities may be running secure programs and do not want their programs mixed with other entities.

Figure 3:
FIG. 3 is a diagram showing illustrative dynamic virtual system provisioning, according to one example of principles described herein.

FIG. 3 is a diagram showing illustrative dynamic virtual system provisioning (300). As mentioned above, when a virtual system (304) is first created or transferred to a particular virtual server system (302), that virtual system will not be able to interact with a network (308) until it is authenticated on that network. Authentication is typically performed using 802.1X protocol as defined by the Institute for Electrical and Electronics Engineers (IEEE).

The 802.1X protocol is set up so that when a device first connects to a particular physical port of a network device (306), standard traffic is not allowed for that device. Rather, a special type of traffic used for authentication is used. The recently connected device sends a request for authentication to an authentication server (310) such as a RADIUS server. After being authenticated and authorized, the authentication server (310) sends provisioning information to the network device (306) to which the device was recently connected. The network device then configures the port that is physically connected to the authenticated device so that that port will route network traffic from that device as normal.

According to certain illustrative examples, the virtual server system (302) is configured to perform this authentication process on behalf of the virtual system (304). Presumably, the virtual server system itself has already been authenticated and thus allowed access to the network (308). Thus, when the virtual server system (302) sends network traffic to the network, the packets associated with that traffic will be tagged with the physical address of the virtual server system. To authenticate one of the virtual systems, the virtual server system sends a request to the authentication server using the 802.1X protocol. However, instead of using its own physical address to tag the data packets associated with the request, the virtual server system tags the appropriate packets with the physical address of the virtual system to be authenticated. This process is sometimes referred to as "spoofing". The virtual server system effectively impersonates the physical address of the virtual system which is being authorized.

Using such a technique, the authentication server (310) receives the authentication request from the virtual server system (302). However, because the packets associated with the request have been tagged with the physical address of one of the virtual systems (304), the authentication believes it is receiving the request from the virtual system (304) itself. The authentication server then checks to see if that device is authorized to operate on the network. If so, then the authentication server sends the appropriate provisioning information to the network device (306) connected to the virtual server system. This network device (306) is often referred to as the neighbor network device (306).

The provisioning information sent by the authentication server (310) informs the neighbor network device (306) how to configure the port connected to the virtual server system (302). The provisioning information may include policy information such as VIDs that should be assigned to traffic from that port with a specific physical address. The provisioning information may also include other information such as rate limiting information or Class of Server (CoS) information.

After the network device has been properly configured, any traffic with the physical address of an authenticated system that is received on the configured port will be allowed to be routed as normal. Thus, even though the virtual server system (302) performed the authentication, the virtual system (304) itself is subsequently allowed to operate as normal over the network. The virtual server system (302) can perform this authentication on behalf of each virtual system (304) it is hosting.

Figure 4:
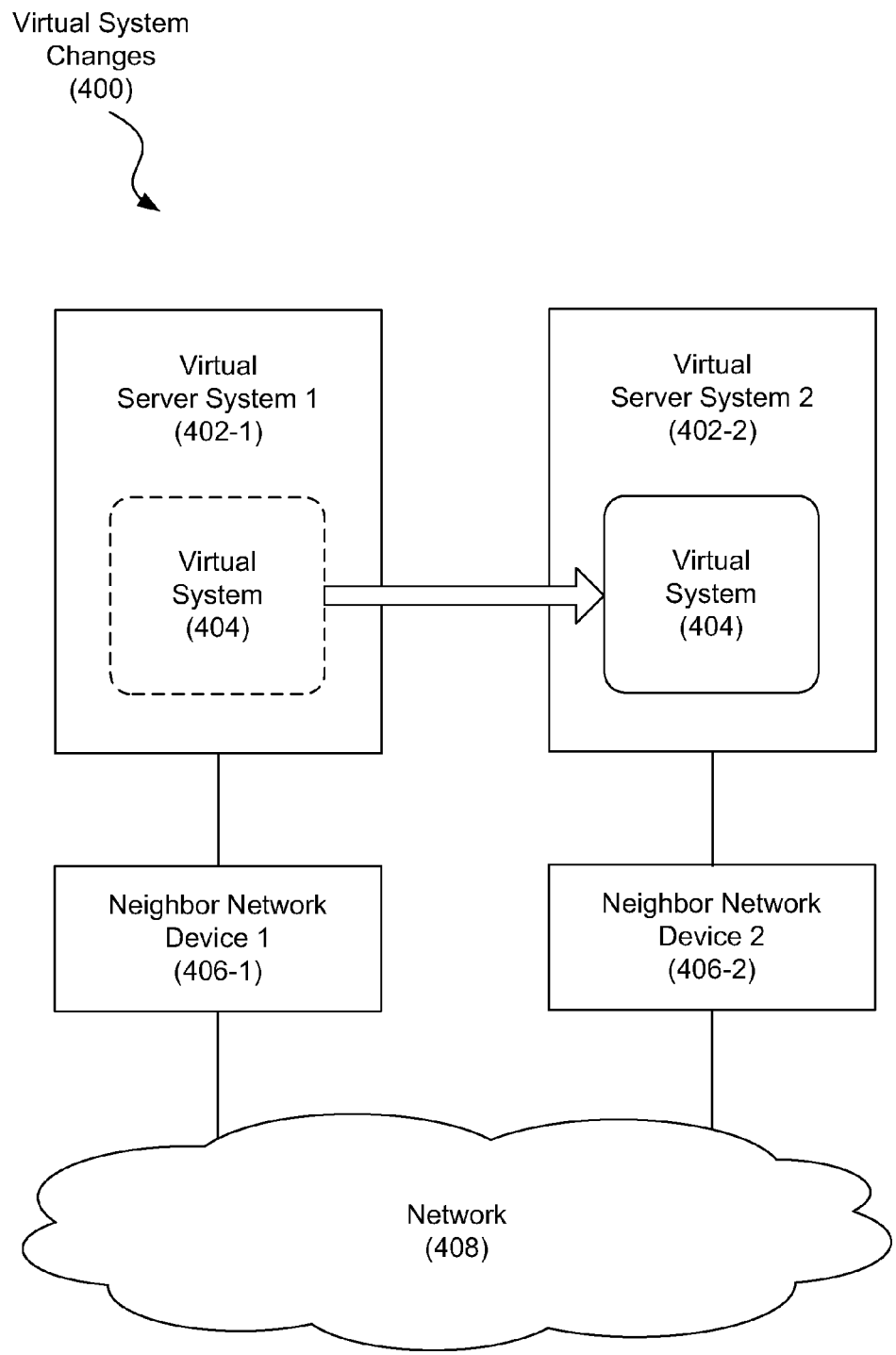
FIG. 4 is a diagram showing illustrative virtual system changes, according to one example of principles described herein.

FIG. 4 is a diagram showing illustrative virtual system changes (400). Just like the virtual server system can authenticate a virtual system; it can also log the virtual system off of the network. If a virtual system is logged off, then a data packet with the physical address of the logged off system will no longer be routed if received by the port on which the system was previously authorized. As virtual server systems are able to perform authentication and logoff procedures on behalf of a virtual system, the mobility of such systems is made easier.

According to certain illustrative examples, a virtual system (404) is transferred from a first virtual server system (402-1) to a second virtual server system (402-2). The first virtual server system (402-1) first logs the virtual system (404) off. Thus, the neighbor network device (406-1) connected to the first virtual server system (406-1) will no longer route traffic with the physical address of the virtual system (404).

When the virtual system (404) is loaded to the second virtual server system (402-2), that virtual server system (402-2) will perform authentication on behalf of the virtual system (404) as described above. Because the provisioning for the virtual system is done dynamically by the switch, the virtual server system administrator has a reduced administrative load.

Figure 5:
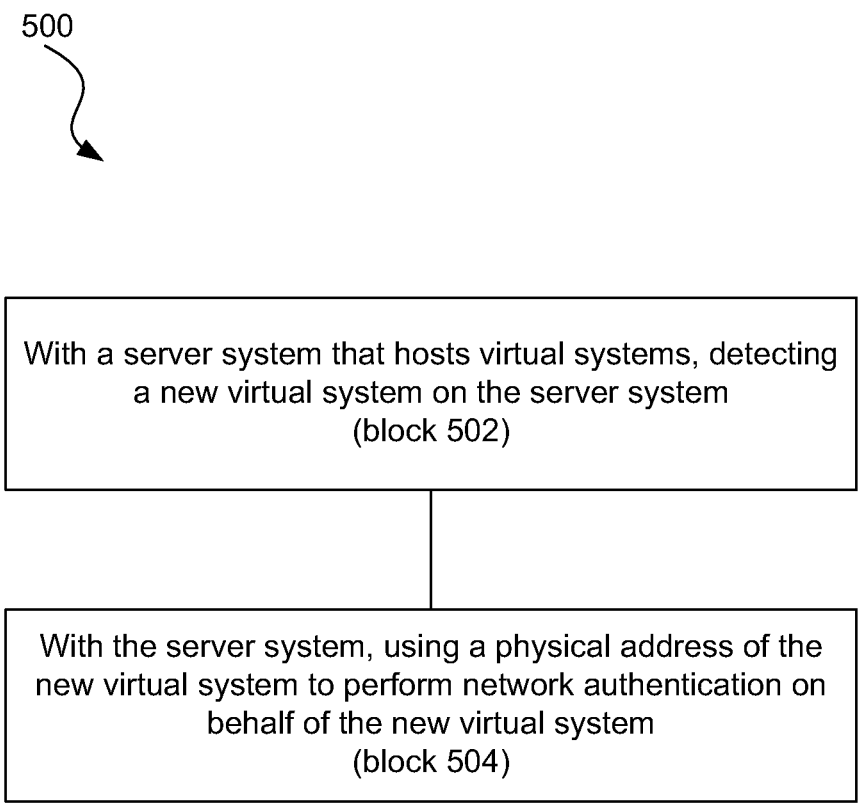
FIG. 5 is a flowchart showing an illustrative method for dynamic provisioning of virtual systems, according to one example of principles described herein.

FIG. 5 is a flowchart showing an illustrative method (500) for dynamic provisioning of virtual systems. According to certain illustrative examples, the method includes, with a server system that hosts virtual systems, detecting (block 502) a new virtual system on the server system, and with the server system, using (block 504) a physical address of the new virtual system to perform network authentication on behalf of the new virtual system.

In sum, through use of methods and systems embodying principles described herein, less administrative effort may be employed to set up virtual systems on new or different virtual servers. Virtual systems may be transferred between different virtual servers with less effort. Moreover, more isolation between the virtual systems and the virtual server may be achieved.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for dynamic provisioning of virtual systems, the method comprising:
with a server system that hosts virtual systems, detecting a new virtual system on said server system;
with said server system, using a physical address of said new virtual system to perform network authentication on behalf of said new virtual system by impersonating the physical address of said new virtual system; and
with said server system, sending an authentication request to an authentication server on behalf of said new virtual system, in which provisioning information received based on the authentication request is to be applied to a port connecting a neighboring network device to said server system.

2. The method of claim 1, further comprising, with said neighboring network device to said server system, receiving said provisioning information for said new virtual system from an authentication server.

3. The method of claim 2, with said neighboring network device, applying said provisioning information to said port connecting said neighboring network device to said server system.

4. The method of claim 1, wherein said new virtual system is a newly created virtual system.

5. The method of claim 1, wherein said new virtual system is transferred from a different server system that hosts virtual systems.

6. The method of claim 1, further comprising, with said server system, removing said new virtual system from said network in response to said new virtual system being removed from said server system.

7. The method of claim 1, further comprising, with said server system, transmitting and sending network traffic for said new virtual system by impersonating said physical address of said new virtual system.

8. A server system to host a number of virtual systems, the server system comprising:
at least one processor;
a memory communicatively coupled to the at least one processor, the memory comprising computer executable code that, when executed by the at least one processor, causes the at least one processor to:
detect a new virtual system on said server system;
use a physical address of said new virtual system to perform network authentication on behalf of said new virtual system by impersonating the physical address of said new virtual system; and
send, from said virtual server system, an authentication request to an authentication server on behalf of said new virtual system, in which:
a source of said authentication request is identified as said new virtual system based on said physical address of said new virtual system being indicated as a source of said authentication request; and
provisioning information received based on the authentication request is to be applied to a port connecting a neighboring network device to said server system.

9. The system of claim 8, wherein in response to said network authentication, said neighboring network device to said server system receives said provisioning information for said new virtual system.

10. The system of claim 9, wherein said neighboring network device is to apply said provisioning information to said port connecting said neighboring network device to said server system.

11. The system of claim 8, wherein said new virtual system is a newly created virtual system.

12. The system of claim 8, wherein said new virtual system is transferred from a different server system that hosts virtual systems.

13. The system of claim 8, wherein said processor is further to remove said new virtual system from said network in response to said new virtual system being removed from said server system.

14. The system of claim 8, wherein said processor is further to transmit and send network traffic for said new virtual system by impersonating said physical address of said new virtual system by tagging packets associated with said network traffic with the physical address of said new virtual system.

15. A method for dynamic provisioning of virtual systems, the method comprising:
with a server system that hosts virtual systems, detecting a new virtual system on said server system;

with said server system, transmitting an authentication request on behalf of said new virtual system, a data packet associated with said request indicating the source of the packet by the physical address of a virtual system running on said server system, in which provisioning information received based on the authentication request is to be applied to a port connecting a neighboring network device to said server system;

with said server system, transmitting data packets associated with said virtual system to a neighboring network device, said network device to allow transmission of data packets associated with said virtual system as a result of said authentication request.

16. The method of claim 15, further comprising, said neighboring network device receiving said provisioning information for said new virtual system from an authentication server.

17. The method of claim 16, with said neighboring network device, applying said provisioning information to said port connecting said neighboring network device to said server system.

18. The method of claim 15, wherein said new virtual system is transferred from a different server system that hosts virtual systems.

19. The method of claim 15, further comprising, with said server system, removing said new virtual system from said network in response to said new virtual system being removed from said server system.

20. The method of claim 15, further comprising, with said server system, transmitting and sending network traffic for said new virtual system by impersonating said physical address of said new virtual system.

* * * * *